United States Patent [19]

Iniotakis et al.

[11] Patent Number: 4,655,797
[45] Date of Patent: Apr. 7, 1987

[54] FINE SCREEN AND FINE SCREEN STACK, THEIR USE AND PROCESS FOR THE MANUFACTURE OF FINE SCREENS

[75] Inventors: Nicolas Iniotakis, Jülich; Claus-Benedict von der Decken, Aachen; Werner Fröhling, Düren; Jochen Schoeller, Stürtzstrasse 25, D-5160 Düren; Hermann Grossman, Neuenbuerg-Arnbach, all of Fed. Rep. of Germany

[73] Assignees: Kernforschungsanlage Jülich Gesellschaft mit beschränkter Haftung, Jülich; Jochen Schoeller, Düren, both of Fed. Rep. of Germany

[21] Appl. No.: 649,044

[22] Filed: Sep. 10, 1984

[30] Foreign Application Priority Data

Sep. 8, 1983 [DE] Fed. Rep. of Germany ..... 33323453

[51] Int. Cl.$^4$ .............................................. B01D 53/22
[52] U.S. Cl. ............................................ 55/16; 55/97; 55/158; 55/524; 55/525; 423/213.5; 427/39; 427/245; 427/405
[58] Field of Search ............ 55/16, 97, 158, 484, 55/524–526; 422/222, 311; 423/213.5, 213.7; 427/38, 39, 244, 245, 247, 405

[56] References Cited

U.S. PATENT DOCUMENTS

| | | | |
|---|---|---|---|
| 2,425,235 | 8/1947 | Ferrante | 55/524 X |
| 2,747,679 | 5/1956 | Ruthardt | 422/222 X |
| 3,010,536 | 11/1961 | Plurien et al. | 55/158 |
| 3,189,563 | 6/1965 | Hauel | 423/213.5 X |
| 3,719,739 | 3/1973 | Thompson | 423/213.5 |
| 3,842,159 | 10/1974 | Niebylski et al. | 423/213.5 |
| 3,849,342 | 11/1974 | Santala | 423/213.5 X |
| 3,857,680 | 12/1974 | Porta et al. | 422/222 X |
| 3,886,095 | 5/1975 | Ford et al. | 423/213.5 X |
| 3,944,504 | 3/1976 | Ford et al. | 423/213.5 X |
| 3,966,645 | 6/1976 | Cairns et al. | 423/213.5 X |
| 3,969,480 | 7/1976 | Fedor et al. | 423/213.5 |
| 4,169,911 | 10/1979 | Yoshida et al. | 55/524 X |
| 4,271,044 | 6/1981 | Fratzer et al. | 423/213.5 X |
| 4,426,320 | 1/1984 | Ernest et al. | 423/213.5 X |
| 4,428,756 | 1/1984 | Iniotakis | 55/484 X |
| 4,511,539 | 4/1985 | Stephenson | 55/526 X |

FOREIGN PATENT DOCUMENTS 817448 8/1951 Fed. Rep. of Germany.
2258906 6/1973 Fed. Rep. of Germany.

OTHER PUBLICATIONS

Klante, Von G., "Ölhydraulik–Filterelemente", Olhydraulik, No. 14, technica 1965, pp. 1237–1239.

Primary Examiner—Robert Spitzer
Attorney, Agent, or Firm—Nils H. Ljungman

[57] ABSTRACT

A fine mesh screen is coated with at least one metal, by galvanic or chemical deposition. Metals of the platinum group are especially advantageous. The mesh width may be as small as 0.1 micron or less. Several screens may be arranged in a stack and used to clean waste gases.

22 Claims, 2 Drawing Figures

FINE SCREEN AND FINE SCREEN STACK, THEIR USE AND PROCESS FOR THE MANUFACTURE OF FINE SCREENS

BACKGROUND OF THE INVENTION

1. Field of the Invention

The invention relates to a fine screen in the form of a coated metal fabric, and to a fine screen stack and its use, and it also includes a process for the manufacture of fine screens.

A fine screen in the context of the present description is a coated metal fabric which, depending on the duration of treatment and the intended application, has fine to extremely fine openings, down to molecular dimensions.

2. Description of the Prior Art

Metal fabrics are characterized by good mechanical strength and resistance to high temperatures and, when appropriate materials are used, by corrosion resistance and high efficiency with a defined "porosity" and a low pressure loss. They are therefore widely used as fine screen filters in various sectors, such as the chemical and petrochemical industries, nuclear technology, in pharmaceutical processes and pollution control, in the production of foods and beverages and in the aviation and space industry.

A significant disadvantage of the metal fabrics, however, consists in the relatively large mesh width, even with fine fabrics, which can retain only particles with a diameter of more than about 5 microns, while the particle sizes of the impurities in gases and/or fluids to be separated can be smaller than that by orders of magnitude.

Of course, with considerable effort and expense, the production of metal fabric has recently been refined (e.g. by Fuji in Japan), and mesh widths of approximately 2 microns are now feasible, although the market price of this fine fabric is approximately 4 to 5 times higher than that of the 5 micron fabric.

For the deposition of such extremely fine particles, therefore, when possible, fiber felts are used with extremely fine deposition active fibers, the filtering action of which is determined more by the large surface area of a tangle of extremely fine fibers than the effective mesh width, which is the governing factor for the pressure loss.

In simulation of such extremely fine filters manufactured on the basis of textiles or ceramics, fine metal fabrics are provided on one side with a sintered metal powder layer (such as "Supramesh" by the firm of Pall Process Filtration Limited), which retain particles with a size greater than 1.5 microns nominal or greater than 15 microns absolute from fluids, and particles of more than 0.5 microns nominal and 3 microns absolute from gases. Even such porous coated metal fabrics will not adequately retain the finest particles, even though the pressure loss caused by such materials is clearly greater than that of uncoated fabrics.

SUMMARY OF THE INVENTION

The problem addressed by the invention is the creation of fine screens which combine the good properties of metal fabrics with an improved retention capability, but without leading to significantly greater pressure losses and costs.

The fine screen of coated metal fabric developed for this purpose is essentially characterized by the fact that the metal coating is formed by a galvanic and/or chemical metal deposit which narrows the mesh width.

On such fine screens, the retention property or the fineness of the filter can be controlled by controlling the deposit, and can extend to the vicinity of 0.01 microns, and establish a defined opening width. Surprisingly, the pressure loss caused by the narrowing of the meshes is not extraordinarily high, and can be largely compensated or over-compensated by increasing the surface area, specifically by a corrugation or folding of the material, depending on the degree of fineness. The additional price for the reduction of the mesh width is thereby less than 100%.

The fabric to be coated itself can be made of a non-noble material, whereby the costs of such filters can also be held down.

In addition, a coating with different metals, which are known to be catalysts as explained below, is possible, so that different catalysts can be used, for example, in a confined space.

DESCRIPTION OF A PREFERRED EMBODIMENT

Figure 1:
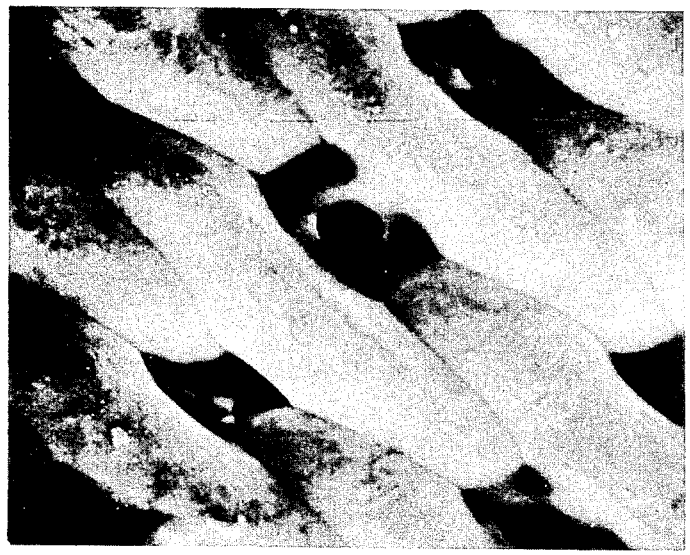
FIG. 1 of the drawings shows the openings of a a metal fabric after interruption of a galvanic deposition process.

In order to deposit a thin coating, the metal fabric is first cleaned and degreased in a manner which is itself known, and if necessary is pickled or deoxidized for the removal of metal oxides. This is followed by a sensitization (depending on the type of precipitation and the metal to be deposited, e.g. in an acid $PdCl_2$ or $NiCl_2$ solution). The desired metal deposition can be done in the absence of current, e.g. with copper or silver, or even nickel, or galvanically, e.g. with copper, nickel or noble metals, or even by combined chemical and galvanic deposits.

Depending on the application, it may be appropriate to roughen up the surface, which leads to an advantageous increase of the surface area.

Of special interest is a metal fabric with a twill braid weave or with a reverse braid weave in the case of a galvanic deposit, which can optionally be done on only one or on both surfaces of such a metal fabric. Since the transport of the metal ions to be deposited is determined by the lines of electrical field, the deposition is limited to the outside surface, while the shielded inner surfaces are not coated to any significant extent. This means that the volume porosity of the metal cloth remains largely intact.

Such a fabric type is therefore especially suited for use as a contact screen for catalytic reactions, since a first catalyst can be deposited on this material [having significant proportions of "inner" space largely shielded from the outside] by a first chemical coating which covers the entire material, after which, by galvanic deposition, concentrated on the exposed "outside" surface, another metal or another two metals can be deposited on one or both sides.

Such coated metal fabrics, especially those with multiple coatings, are especially suited for use in chemical processes, e.g. in ammonia synthesis or in the cleaning of waste gases (especially automobile exhaust gases).

Appropriately coated metal fabrics or several metal fabrics can be arranged one after another in the form of a fine screen stack, which can generally carry a flow transverse to the surface, or for catalytic purposes in the direction of the ducts formed between the succeeding layers.

Fine screen stacks of corrugated fine screens, the directions of whose corrugations are at an angle to one another, prove to be particularly well-suited for the catalytic purification of gas, since the gas, which generally flows parallel to the fine screen surface, is forced into a continuous detouring or slowing-down and acceleration. Such fine screen stacks for gas purification can be in contact with the tops of the corrugations and form, when stiffened in the assembly frame, highly efficient and relatively low-noise contact masses. A filter mat of coarser mesh width may also be provided.

Currentless deposition (a) and galvanic deposition (b) differ from one another in terms of the resulting product:

(a) In the case of the currentless deposit, all of the fabric surfaces are uniformly coated, including those which lie inside the metal cloth. By controlling the amount deposited, the mesh width can therefore be regulated over the entire fabric thickness ("volume porosity"). These clearly show a decrease in the size of the pores with an increasing coating thickness. By means of such a currentless deposit, any desired filter fineness can be achieved, with a simultaneous increase in the mechanical strength. The densely-deposited metal, even when deposited in a thin layer, protects the fabric itself from corrosion (when appropriate materials are chosen). The result is not only an economic advantage (for example, very fine fabric with a gold surface with a mesh width of less than 50 microns can only be produced in this manner, since gold itself cannot be woven in such fine dimensions). A disadvantage, however, is the decrease of the "volume porosity," whereby the pressure loss is increased during flow.

(b) In the case of a galvanic deposit, depending on the backplate electrode, one or even both surfaces of the metal fabric can be coated, since the transport of the metal ions to be deposited, as mentioned above, is determined by the path of the lines of electric field. In the case of the above-mentioned braid weave, the shielded "inner38 surfaces are not significantly coated. This means that the volume porosity of the metal fabric remains largely intact.

Depending on the duration of the coating process, the "outer" openings of the metal fabric will now be closed on the surface in the manner of a membrane. FIG. 1, for example, shows under 800 X enlargement a metal fabric after an interruption of the galvanic deposition process. There is a reduction in the size of the opening by a factor of at least 2. Since the deposition process can be controlled by means of the duration of the current, it is possible to obtain any desired opening size, down to a complete closing. Therefore microporous metallic membranes can be manufactured, which are effective as filters for particle sizes down to the molecular range. This is important for osmosis processes, among other things.

(c) The two processes mentioned above, currentless and galvanic deposition, can also be used in combination. Thus it is possible to initially protect a moderately-priced base fabric against corrosion by the currentless process, without significantly reducing the volume porosity. Then, the pore size can be adjusted as required by the galvanic deposition process.

Figure 2:
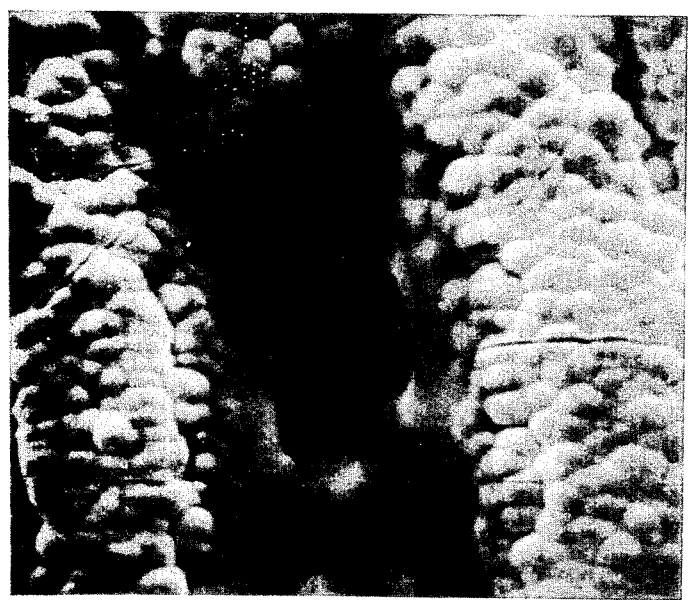
FIG. 2 shows a twill with a thin coating of palladium applied thereto.

The fine screens and fine screen stacks described above can, as noted, be used for catalytic purposes. Ordinary catalytic materials such as Pd, Au, Pt etc. can be deposited by both the currentless process and the galvanic process. According to the invention, it is therefore possible to obtain very large catalyst surfaces with very small amounts of catalyst, as shown in FIG. 2. This figure shows a twill braid weave by the firm of Duerener Metalltuch (Micronic weave with a 5 micron mesh width) with a unilateral coating of 3 to 4 microns Pd. The enlargement of the effective catalyst surface is readily apparent. At the same time it can be seen that the applied catalyst also improves the fineness of the filter. In an alternative embodiment of the invention, the mesh width is narrowed down to less than 0.1 micron. Tests regarding the permeation or penetration of gas through coated or uncoated metal fabrics showed a volume penetration of argon at 21° C. and a pressure differential of 27 mbar of approximately 21.7Nl/m$^2$s with a coated metal fabric and of 28.9Nlm$^2$s with an uncoated fabric (the pressure ahead of the fabric was 1.2 bar). That means that the reduction in throughput is relatively low. As explained in greater detail above, different catalysts can be deposited on each side (especially with a twill braid or reverse braid weave).

Therefore, by means of additional currentless precoating, the production of three different catalyst coatings on a metal fabric is possible: inside the fabric, the material deposited there by the currentless process remains free, with a different galvanically-deposited material on each of the two surfaces. These materials can be different metals or different metal alloys, or concentrations of alloy components.

By combining two different metal fabrics each coated with three different catalysts, for example, six different catalyst surfaces can be brought together in a very small space. It is possible to attach or stabilize two or more metal fabrics in relation to one another by a joint folding or corrugation.

Of course, intermediate or final baking treatments can be carried out as necessary.

The fine screens and fine screen stacks are generally suitable for filtration purposes, and for catalytic processes, and for combinations of the two. Depending on the surface coating, they can also be used as adsorbers or absorbers.

While the foregoing describes and illustrates certain present preferred embodiments, it is to be understood that the invention is not limited thereto and may be otherwise variously practiced within the scope of the following claims.

We claim:

1. A method of cleaning a waste gas by catalytic action which includes passing the gas through a fine metal screen on which at least two different metal catalysts have been deposited by at least one of galvanic and chemical metal deposit and wherein said at least two different metal catalysts are disposed, at least partially, one adjacent the other.

2. The method of claim 1, in which the waste gas is also passed through a filter screen of coarser mesh than the fine screen.

3. In a process for the manufacture of a metallic fine screen, based on a metal fabric having mesh openings of a predetermined mesh width, said process depositing metal on said screen, said process comprising:

coating a cleaned bright metal with at least one metal said coating with at least one metal comprising galvanically coating by depositing on said metal fabric a galvanic metallic layer, such that, said coating forms membranes extending to narrow said mesh openings to restrict said mesh openings of said metal fabric and thereby forming narrowed openings having mesh widths of less than two microns and being substantially smaller than said mesh openings of said metal fabric when galvanically uncoated, whereby said narrowed openings formed by said membranes filter out, in use, material which is substantially smaller than material filterable by a metal fabric not having said membranes deposited thereon and being substantially similar to said metal fabric when uncoated.

4. A process according to claim 3, in which the metal fabric is first coated chemically with a first metal, and then galvanically with at least one other metal.

5. A process according to claim 3, in which the metal fabric is coated on opposite sides with different metals.

6. A process according to claim 5, in which the different metals are galvanically deposited.

7. A process according to claim 3, in which a catalytically active metal is deposited in at least some regions.

8. A process according to claim 7, in which the catalytically active metal is deposited only on one side of the metal fabric.

9. A process according to claim 7, in which different catalytically active metals are deposited on the opposite sides of the metallic fine screen.

10. A fine screen stack comprising a plurality of layers of metal fabric on which at least one coating is formed by galvanic deposit;
said coated metal fabric having mesh openings of a mesh width of less than two microns;
said metal fabric having an inner portion within said mesh openings and at least one outer portion on opposing outer surfaces thereof;
said metal fabric having at least one metal coating being deposited on said at least one outer portion of at least one of said outer surfaces of said metal fabric;
said at least one galvanically deposited metal coating forming membranes extending from said at least one outer portion of said metal fabric to restrict said mesh openings of said metal fabric by forming openings substantially smaller than said mesh openings of said metal fabric and being less than two microns in width; and
said layers of coated metal fabric being positioned in adjacent relationship to form a stack.

11. A fine screen stack according to claim 10, in which said stack is formed by a series of corrugated fine screens contacting one another at their wave crests.

12. A fine screen stack according to claim 11, in which the fine screens are disposed in angular relationship one to another.

13. A fine screen in the form of a metal fabric for filtering out materials, said metal fabric having mesh openings of a predetermined mesh width;
said metal fabric having an inner portion within said mesh openings and at least one outer portion on opposing outer surfaces thereof;
said screen comprising at least one metal coating being galvanically deposited on at least said at least one portion of said metal fabric; and
said at least one galvanically deposited metal coating forming membranes extending from said at least one portion of said metal fabric to restrict said mesh openings of said metal fabric and forming openings having a width of less than two microns and being substantially smaller than said mesh openings of said metal fabric, so that said less than two microns wide openings formed by said membranes comprises a filter for filtering out material which is substantially smaller than material filterable by metal fabric equivalent to said metal fabric not having said membranes deposited thereon.

14. A fine screen according to claim 1, in which the galvanic metal deposit has a roughened and expanded surface.

15. A fine screen according to claim 13, in which the coating is done galvanically and from both sides of the fabric with different metals.

16. A fine screen according to claim 15, in which the screen is first currentlessly coated with a third metal.

17. A fine screen according to claim 16, in which the metal fabric has at least one of a twill-braid weave and a reverse braid weave.

18. A fine screen according to claim 13, in which the coating consists of a noble metal on a non-noble metal fabric.

19. A fine screen according to claim 13, in which the screen is formed in a corrugated or folded shape whereby the surface area is enlarged.

20. A fine screen according to claim 13, in which the mesh width of said membrane opening is narrowed down to less than 0.1 micron.

21. A fine screen in the form of a metal fabric coated with at least two different metal catalysts;
said at least two different metal catalysts having been formed by at least one of galvanic and chemical metal deposit; and
said at least two different metal catalysts being disposed, at least partially, one adjacent the other.

22. The fine screen according to claim 21, wherein at least one of said at least two different metal catalysts have been formed by galvanic deposit.

* * * * *